UNITED STATES PATENT OFFICE.

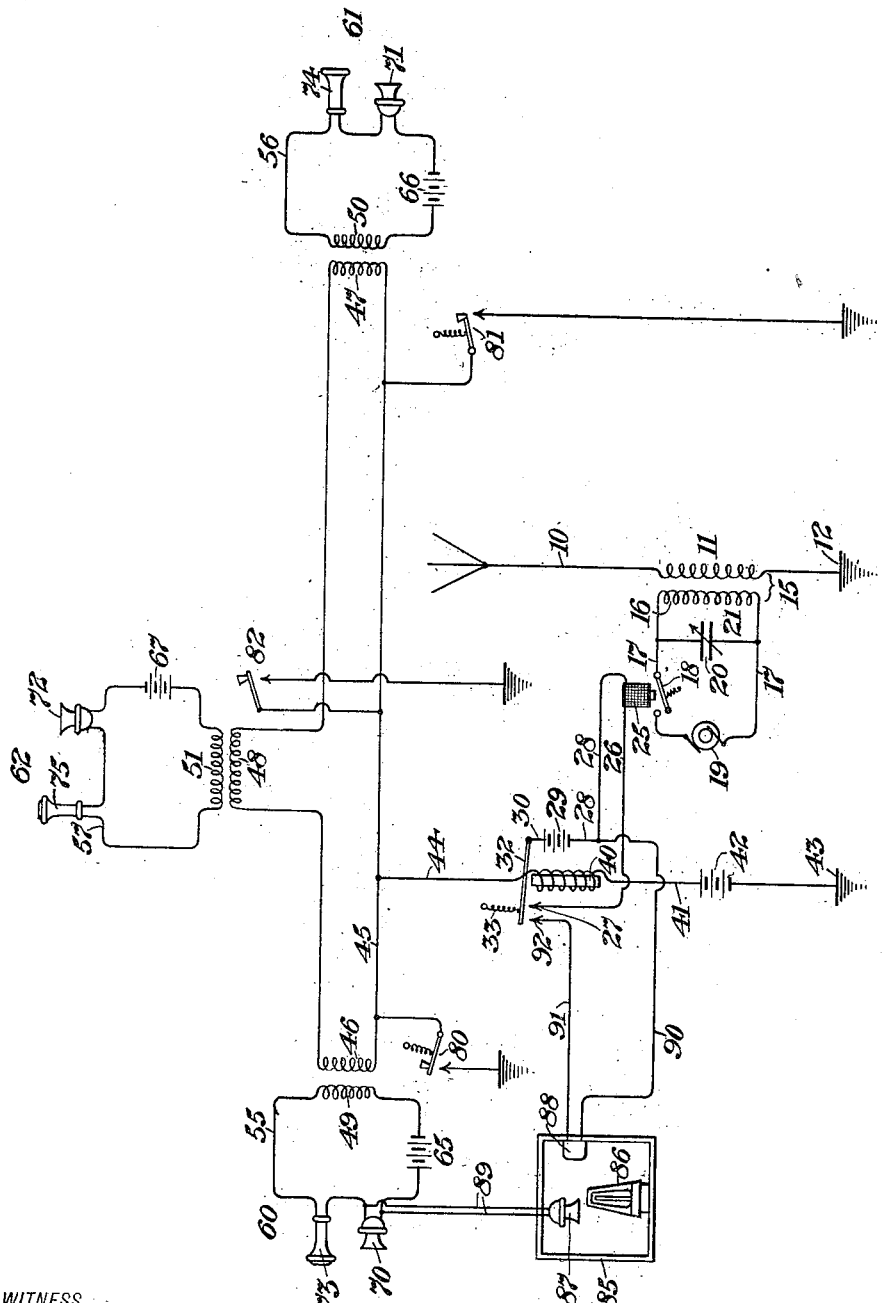

JOHN HAYS HAMMOND, JR., OF GLOUCESTER, MASSACHUSETTS.

TRANSMISSION SYSTEM FOR RADIANT ENERGY.

1,425,523.   Specification of Letters Patent.   Patented Aug. 15, 1922.

Application filed June 22, 1917, Serial No. 176,309. Renewed January 7, 1922. Serial No. 527,777.

*To all whom it may concern:*

Be it known that I, JOHN HAYS HAMMOND, Jr., a citizen of the United States, and a resident of the city of Gloucester, in the county of Essex and State of Massachusetts, have invented certain new and useful Improvements in Transmission Systems for Radiant Energy, of which the following is a specification.

Some of the objects of this invention are to provide an improved system for transmitting electro-radiant energy; to provide a system for the transmission of radiant energy having a central control station and one or more auxiliary control stations and in which means is provided for informing the operator at any one of the auxiliary stations as to the responsiveness of the central station; and to provide other improvements as will appear hereinafter.

The accompanying drawing is a diagrammatic representation of a transmission system constructed in accordance with this invention.

Referring to the drawing, one embodiment of this invention comprises an antenna 10 or open aerial circuit, which includes an inductance 11 and which is grounded through the inductance as at 12. The inductance 11 forms the secondary of a transformer 15 which includes a primary inductance 16 which is in a circuit 17 controlled by a normally open switch 18 and arranged to be energized by a high frequency electric alternator 19. A variable condenser 20 is connected in a well known manner to form with the primary inductance 16, a closed oscillatory circuit 21, which is preferably tuned to the natural frequency of oscillation of the open aerial circuit 10, 11 and 12.

The normally open switch 18 is arranged to be controlled by an electromagnet 25, one end of the winding of which is connected by a conductor 26 to a fixed terminal 27. The other end of the winding of the magnet 25 is connected by a conductor 28 to one pole of a battery 29 the other pole of which is connected by conductor 30 to a switch 32 which is arranged to swing into and out of engagement with the fixed terminal 27, and which is normally held open by a spring 33.

For controlling the normally open switch 32 either from a central station or from any one of a plurality of auxiliary stations, an electromagnet 40 is suitably arranged. One end of the coil of this magnet 40 is connected by a conductor 41 through a battery 42 to a suitable ground 43, and the other end of the coil of the magnet 40 is connected by a conductor 44 to a closed circuit 45 including a plurality of inductances 46, 47 and 48, which are arranged at suitable points to be inductively acted upon by corresponding inductances 49, 50 and 51, which are arranged respectively in closed circuits 55, 56 and 57, which are located respectively in a central control station 60, and two auxiliary stations 61 and 62. These closed circuits 55, 56 and 57 are arranged to be energized respectively by three batteries 65, 66 and 67, and have in series therewith respectively, telephone transmitters 70, 71 and 72, and telephone receivers 73, 74 and 75. The closed circuit is grounded at the central station 60 and at the auxiliary stations 61 and 62 respectively, through normally open switches or keys 80, 81 and 82, which are arranged so that an operator at any one of these stations may control the transmission of electroradiant energy from the open aerial circuit 10, 11 and 12.

To enable an operator at any one of the stations 60, 61 or 62 to be informed through the corresponding telephone receiver 73, 74 or 75, as to whether or not the closing of the corresponding key 80, 81 or 82 effects the operation of the normally open switch 32 which controls the emission of radiant energy from the antenna 10, a stationary casing 85 is provided which contains a metronome 86, a telephone transmitter 87 and a buzzer 88. The telephone transmitter 87 is connected in parallel with the telephone transmitter 70 of the central station 60 by means of a conductor 89. One end of the coil of the buzzer 88 is connected by a conductor 90 to the conductor 28 and is thereby connected through the battery 29 to the switch 32. The other end of the coil of the buzzer 88 is connected by a conductor 91 to a fixed terminal 92 which is arranged to be controlled by the normally open switch 32, so that when the switch 32 is in engagement with the terminal 27 for closing the circuit through the battery 29 and electromagnet 25, to energize the antenna 10, 11, the switch 32 will also be in engagement with the terminal 92 and will close the branch circuit through the battery 29 and thus energize the buzzer 88.

In the operation of this improved system, a telephonic communication may be had at any time between any two of the stations without any adjustment of the switches. When an operator at any one of the stations desires to transmit radiant impulses from the antenna 10, 11 and 12, the corresponding switch 80, 81 or 82 is closed, thus closing the circuit through the electromagnet 40 and the battery 42, and thus closing the normally open switch 32 which closes the circuit through the battery 29 and electromagnet 25, and at the same time the circuit through the buzzer 88 which is energized by the battery 29. By thus energizing the electromagnet 25, the circuit is closed through the alternator 19, thus causing electrical oscillations in the closed oscillatory circuit 16, 21, which sets up corresponding oscillations in the antenna 10 and 11, thus causing the emission of electroradiant waves. At the same time, the energization of the buzzer 88 sets up sound waves in the casing 85, which act through the telephone transmitter 87 upon the closed circuit 49, 55, through the battery 65, and this sets up electrical oscillations in this closed circuit which act inductively upon the closed circuit 45, 46, 47, 48, and thus transmits the sounds of the buzzer 88 to the telephone receivers 73, 74, and 75 of all of the stations. It is thus possible for an operator at any one of the stations to determine by listening at the corresponding receiver whether or not the closing of the corresponding switch 80, 81 or 82 has effected the operation of the switch 32 and presumably of the open aerial circuit 10, 11.

The metronome 86 is normally kept in operation by a clock mechanism or by any other suitable mechanism, and its regular beats are transmitted at all times through the transmitter 87, through the battery 65 of the central station 60, which causes the beats to be set up inductively in the closed circuit 45, 46, 47 and 48, and to act inductively upon the telephone receivers 73, 74 and 75. Thus an operator at any one of the stations by listening at the corresponding receiver 73, 74 or 75, may hear the regular beats of the metronome 86 and may limit the duration of any impulse or signal transmitted in accordance with the beats of the metronome. For instance, the operator might limit the short impulses or signals to the time between two successive beats of the metronome, and the long impulses to the time required for six beats of the metronome. The metronome serves therefore as a convenient means for keeping the operator informed as to the proper length of time to continue any given signal.

Although only a single form is shown herein in which this invention may be embodied, it is to be understood that the invention is not limited to any specific construction, but might be embodied in various forms without departing from the spirit of the invention or the scope of the appended claims.

Having thus fully described this invention, I claim:

1. The combination with means for transmitting energy, of means including a switch for controlling said transmission means, sound producing means controlled by said switch for announcing the operation of said switch, a distant station for operating said controlling means, and means for transmitting sound from said producing means to said distant station.

2. The combination with means for transmitting radiant energy, of means for controlling said transmission means from any one of a plurality of distant stations, and sound producing means arranged to be controlled from any one of said stations as a result of the control of said transmission means, and which is unresponsive to radiant energy transmitted by said transmission means.

3. The combination with means for transmitting radiant energy, of means for controlling said transmitting means from a distant station, a sound producing device arranged to be controlled as a result of the control of said transmitting means from said station, sound transmitting means relatively near to said sound producing device so a to be controlled thereby, and sound receiving means arranged at said station and controlled by said sound transmitting means for announcing the control of said first mentioned means.

4. The combination with means for transmitting radiant energy, of means for controlling said transmitting means from a distant station, a sound producing device arranged relatively near to said transmitting means and relatively remote from said station to be controlled as a result of the control of said transmitting means from said station, sound transmitting means arranged relatively near to said sound producing device so as to be controlled thereby, and sound receiving means arranged at said station and controlled by said sound transmitting means for announcing the control of said first mentioned means.

5. The combination with means for transmitting radiant energy, of means for controlling said transmitting means from a distant station, a sound producing device arranged to be controlled as a result of the control of said transmitting means from said station, a second sound producing device arranged near to said first mentioned device and continuously operative independently of said first mentioned device, sound transmitting means arranged near to both of said sound producing devices so as to be controlled thereby, and sound receiving means arranged at said station and controlled by said sound transmitting devices for announcing the control of said first mentioned means.

6. The combination with means for transmitting radiant energy, of means for controlling said transmitting means from any one of a plurality of distant stations, a sound producing device arranged to be controlled as a result of the control of said transmitting means from said station, sound transmitting means arranged near to said sound producing device so as to be controlled thereby, and sound receiving means arranged at each of said stations and controlled by said sound transmitting device for announcing the control of said first mentioned means.

7. The combination with means for transmitting radiant energy, of means for controlling said transmitting means from any one of a plurality of distant stations, a sound producing device arranged to be controlled as a result of the control of said transmitting means from any one of said stations, a second sound producing device arranged near to said first mentioned device and operative independently thereof, sound transmitting means arranged near to both of said sound producing devices so as to be controlled thereby, and sound receiving means arranged at each of said stations and controlled by said sound transmitting devices for announcing the control of said first mentioned means.

8. The combination with means for transmitting radiant energy, of means for controlling said transmitting means from any one of a plurality of stations, and including a closed circuit operatively connecting said stations, and means located at each one of said stations and operatively connected to said closed circuit for transmitting and receiving sounds.

9. The combination with means for transmitting radiant energy, of means for controlling said transmitting means from any one of a plurality of stations, and including a closed circuit operatively connecting said stations, means located at each one of said stations and operatively connected to said closed circuit for transmitting and receiving sounds, and sound producing means arranged to be controlled as the result of the control of said transmitting means and operatively connected to said closed circuit to announce the control of said transmitting means at said stations.

10. The combination with means for transmitting radiant energy, of a plurality of distant stations, means common to all of said stations for controlling said transmission means, sound producing means arranged to be controlled from any one of said stations as a result of the control of said transmitting means, and means for transmitting sound from said sound producing means to all of said stations.

11. The combination with means for transmitting energy, of means arranged to control said transmitting means selectively from any one of a plurality of distant stations, sound producing means communicating with all of said stations and arranged to be controlled as a result of the control of said transmitting means from any one of said stations.

12. The combination with means for transmitting energy, of means arranged to control said transmitting means selectively from any one of a plurality of distant stations and a source of periodic impulses communicating with all of said stations.

13. The combination with means for transmitting signals, of means for controlling said transmission means selectively from any one of a plurality of distant stations, and a metronome communicating with all of said stations to serve as a standard of time measurement for guiding the operations at the said stations in sending signals.

14. The combination with means for transmitting signals of means for controlling said transmission means from any one of a plurality of distant stations, and a source of periodic impulses communicating with all of said stations and arranged to be controlled as a result of the control of said transmission means from any one of said stations to indicate the operation of said transmission means.

15. The combination with means for transmitting signals, of means for controlling said transmission means from any one of a plurality of distant stations, and a source of periodic sound impulses communicating with all of said stations and arranged to be controlled as a result of the control of said transmission means from any one of said stations to indicate the operation of said transmission means.

16. The combination with means for transmitting energy, of means for controlling said transmission means from a plurality of distant stations, a casing, a buzzer arranged in said casing and controlled as a result of the control of said transmission means, a telephone transmitter arranged in said casing to be energized by said buzzer, and telephone receivers at said stations respectively and communicating with said transmitter.

17. The combination with means for transmitting signals, of means arranged to be controlled selectively from a plurality of distant stations for controlling said transmitting means, a casing, a buzzer arranged in said casing to be energized, as a result of the control of said transmission means, a metronome in said casing, and a telephone transmitter in said casing and communicating with all of said stations, said telephone transmitter being arranged to receive sounds from said buzzer and said metronome.

18. The combination with a plurality of distant stations, a telephone transmitter and a telephone receiver at each of said stations, a closed circuit operatively connecting said stations and operatively connecting the transmitter of each station with the receivers of other stations, an electrical connection between said closed circuit and the ground including a source of energy and an electromagnet, a switch controlled by said electromagnet, means for transmitting signals controlled by said switch, a normally open ground connection for said circuit at each of said stations, means for closing each of said normally open ground connections from time to time to send signals, and a source of sound controlled by said switch and communicating with all of said telephone receivers.

19. The combination with a plurality of distant stations, a telephone transmitter and a telephone receiver at each of said stations, a closed circuit operatively connecting said stations and operatively connecting the transmitter of each station with the receivers of other stations, an electrical connection between said closed circuit and the ground including a source of energy and an electromagnet, a switch controlled by said electromagnet, means for transmitting signals controlled by said switch, a normally open ground connection for said circuit at each of said stations, means for closing each of said normally open ground connections from time to time to send signals, a source of sound controlled by said switch and communicating with all of said telephone receivers, and a metronome communicating with all of said receivers.

Signed at New York in the county of New York and State of New York this 11th day of June A. D. 1917.

JOHN HAYS HAMMOND, Jr.